(12) United States Patent
Ashino et al.

(10) Patent No.: US 10,096,430 B2
(45) Date of Patent: Oct. 9, 2018

(54) CAPACITOR AND METHOD OF MANUFACTURING CAPACITOR

(71) Applicant: Nippon Chemi-Con Corporation, Shinagawa-ku, Tokyo (JP)

(72) Inventors: Hirotsugu Ashino, Tokyo (JP); Junya Shiroto, Tokyo (JP)

(73) Assignee: Nippon Chemi-Con Corporation, Tokyo (JP)

(*) Notice: Subject to any disclaimer, the term of this patent is extended or adjusted under 35 U.S.C. 154(b) by 0 days.

(21) Appl. No.: 15/319,774

(22) PCT Filed: May 21, 2015

(86) PCT No.: PCT/JP2015/064563
§ 371 (c)(1),
(2) Date: Dec. 17, 2016

(87) PCT Pub. No.: WO2015/194310
PCT Pub. Date: Dec. 23, 2015

(65) Prior Publication Data
US 2017/0125170 A1    May 4, 2017

(30) Foreign Application Priority Data

Jun. 18, 2014 (JP) .................. 2014-125269

(51) Int. Cl.
*H01G 9/145* (2006.01)
*H01G 9/02* (2006.01)
(Continued)

(52) U.S. Cl.
CPC ............ *H01G 9/145* (2013.01); *H01G 9/008* (2013.01); *H01G 9/0029* (2013.01); *H01G 9/02* (2013.01);
(Continued)

(58) Field of Classification Search
CPC ........ H01G 9/145; H01G 9/0029; H01G 9/008; H01G 9/02; H01G 9/048
See application file for complete search history.

(56) References Cited

U.S. PATENT DOCUMENTS

| 4,888,666 A | 12/1989 | Naitoh et al. |
| 4,889,536 A | 12/1989 | Naitoh et al. |

(Continued)

FOREIGN PATENT DOCUMENTS

| CN | 87 1 03667 A | 12/1987 |
| JP | H03-203216 A | 9/1991 |

(Continued)

OTHER PUBLICATIONS

International Search Report from International Patent Application No. PCT/JP2015/064563, dated Jul. 28, 2015.
(Continued)

*Primary Examiner* — Dion R Ferguson
(74) *Attorney, Agent, or Firm* — Shapiro, Gabor and Rosenberger, PLLC

(57) ABSTRACT

A capacitor structure and a manufacturing method achieve suppression of ESR increase and improved productivity for electrolytic capacitors produced by a manufacturing process in which an additive layer is applied to a separator before impregnation of a capacitor element. An anode foil and a cathode foil having undergone an area increasing process are laminated and wound via separators, on which additive layers are formed on respective one surfaces, to produce the capacitor element. At least the separator having a surface at the center side of the capacitor element facing the anode foil and a surface at the outer circumference side of the capacitor element facing the cathode foil, has the additive layer formed on the surface at the center side of the capacitor element.

10 Claims, 5 Drawing Sheets

(51) Int. Cl.
  *H01G 9/00* (2006.01)
  *H01G 9/008* (2006.01)
  *H01G 9/048* (2006.01)
  *H01G 9/035* (2006.01)
  *H01G 9/055* (2006.01)

(52) U.S. Cl.
  CPC ............ *H01G 9/035* (2013.01); *H01G 9/048* (2013.01); *H01G 9/055* (2013.01)

(56) References Cited

U.S. PATENT DOCUMENTS

| | | | | |
|---|---|---|---|---|
| 6,058,006 | A * | 5/2000 | Yoshioka | H01G 9/02 252/62.2 |
| 2003/0180622 | A1* | 9/2003 | Tsukuda | D21H 15/02 429/249 |
| 2006/0126263 | A1* | 6/2006 | Tsunekawa | H01G 9/155 361/301.1 |
| 2006/0257728 | A1* | 11/2006 | Mortensen | H01M 2/1653 429/144 |
| 2009/0220855 | A1* | 9/2009 | Shelekhin | H01M 2/16 429/163 |
| 2011/0059343 | A1* | 3/2011 | McKinney | H01M 2/162 429/94 |
| 2015/0294801 | A1* | 10/2015 | Hayakawa | H01G 11/52 361/502 |

FOREIGN PATENT DOCUMENTS

| | | |
|---|---|---|
| JP | H04-73922 A | 3/1992 |
| JP | H05-152166 A | 6/1993 |
| JP | H10-223481 A | 8/1998 |
| JP | H11-111571 A | 4/1999 |
| JP | 2001-189239 A | 7/2001 |
| JP | 2001-189240 A | 7/2001 |
| JP | 2013-232538 A | 11/2013 |

OTHER PUBLICATIONS

Office Action dated Jan. 9, 2018, in Japanese Patent Application No. 2014-125269.
Office Action dated Jan. 29, 2018, in Chinese Patent Application No. 201580031634.6.

* cited by examiner

CAPACITOR AND METHOD OF MANUFACTURING CAPACITOR

TECHNICAL FIELD

The present disclosure relates to a capacitor and a method of manufacturing the capacitor.

BACKGROUND ART

Electrolytic capacitors are passive elements that charge and discharge electrical charges by electrostatic capacity. Such electrolytic capacitors include a capacitor element impregnated with an electrolyte solution and placed in an outer casing, the outer casing is sealed by a seal body, and lead terminals are drawn out from the seal body. The capacitor element includes an anode foil formed of a valve metal foil such as aluminum with an oxide film as a dielectric layer formed thereof, a cathode foil formed of the same or different metal foil and facing the anode foil, and a separator between the anode foil and the cathode foil.

The anode foil is produced by performing an area increasing process on a valve metal in order to increase the surface area, and then performing a chemical conversion process of applying a voltage in a chemical conversion solution to form an oxide film on the surface of the valve metal. The cathode foil is formed by performing an area increasing process, and a chemical conversion process if necessary to form a dielectric oxide film. The separator suppresses a short-circuit of the anode foil and the cathode foil, while at the same time, holds the electrolyte solution. The separator is selected from separators mainly formed of natural fibers, such as craft paper, Manila paper, and pulp, separators mixed with synthetic fibers, and separators mainly formed of synthetic fibers.

The capacitor element is produced by connecting electrode lead terminals with the anode foil and the cathode foil respectively, and laminating and winding the anode foil and the cathode foil via the separator therebetween. The electrolytic capacitor is manufactured by impregnating the capacitor element with the electrolyte solution, inserting the capacitor element into an outer casing, sealing the outer casing, and then performing the chemical conversion again.

As for electrolytic capacitors, it is known to add a withstand voltage improving agent like polyvinyl-alcohol to the electrolyte solution (see, for example, Patent Document 1 and Patent Document 2). This is because by adding polyvinyl alcohol to the electrolyte solution, the ignition voltage of the electrolyte solution rises, and the withstand voltage of the electrolytic capacitor is improved.

When, however, polyvinyl-alcohol is added to the electrolyte solution, the viscosity of the electrolyte capacitor increases, and thus the impregnation performance of the electrolyte solution to the capacitor element decreases. That is, it becomes difficult for the electrolyte solution to be impregnated into pits formed on the anode foil and the cathode foil by the area increasing process. In this case, voids may be formed between the electrolyte solution and the internal surface of the pit regarding the pit, causing the reduction of the electrostatic capacity and the increase of a resistance of the electrolytic capacitor.

Hence, a manufacturing method has been conventionally proposed (see, for example, Patent Document 3 and Patent Document 4) of applying polyvinyl-alcohol to the separator before the impregnation of the capacitor element, impregnating the electrolyte solution into this capacitor element, and causing polyvinyl-alcohol to be dissolved in the electrolyte solution by a thermal process included in a chemical conversion process. According to this manufacturing method, since no polyvinyl-alcohol is added to the electrolyte solution at the time of impregnation, the viscosity of the electrolyte solution is not increased, facilitating the impregnation of the electrolyte solution into the pits of the capacitor element, while at the same time, improving the withstand voltage by causing polyvinyl-alcohol to be dissolved to the electrolyte solution that has been impregnated deeply inside the pits.

CITATION LIST

Patent Literatures

Patent Document 1: JP H4-73922 A
Patent Document 2: JP H5-152166 A
Patent Document 3: JP H11-111571 A
Patent Document 4: JP 2001-189240 A

SUMMARY OF INVENTION

Technical Problem

Conventional technologies are intended to suppress an increase of the viscosity of the electrolyte solution before the impregnation of the capacitor element. Hence, like the disclosure of Patent Document 3, there was no particular technical problem in applying polyvinyl-alcohol to any surfaces of the separator.

In recent years, there is a demand for a further increase of the capacity of electrolytic capacitors, and thus in order to further increase the surface area of the anode foil, the area increasing process has been highly densified. However, the surface area increase by a further densification is now reaching the limit, and thus an achievement of a larger capacity is attempted by increasing the thickness of the anode foil relative to the conventional thickness, increasing the area to be subjected to the area increasing process. For example, the anode foil conventionally had a thickness of substantially 100 μm, but now has a thickness of substantially 112-136 μm.

The anode foil has the oxide film on the surface which is hardened in ceramics state. Hence, the more the thickness increases, the greater the repulsive force that attempts to expand toward the outer circumference side of the capacitor element becomes when the anode foil is wound, coil spring. In this case, as illustrated in FIG. 5, an anode foil 2 pushes up a separator 4 adjacent thereto at the outer circumference side of the winding toward the outer circumference side, and the pushed separator 4 is further pushed against a cathode foil 3 adjacent thereto at the outer circumference side.

In general, the cathode foil 3 has a lower density of the area increasing process than that of the anode foil 2, and has a smaller surface roughness. That is, the concavities and convexities of the surface of the cathode foil 3 are less than those of the anode foil. Hence, when an additive layer 4a of polyvinyl-alcohol is formed on the surface of the cathode foil 3 side of the separator, the pushed separator 4 against the cathode 3 due to the expansion of the anode foil 2 causes the cathode foil 3 to be in close contact with the additive layer 4a of polyvinyl-alcohol, making a formation of the gap between the separator 4 and the cathode foil 3 difficult.

The gap between the separator 4 and the cathode foil 3 is one of the impregnation paths for the electrolyte solution at the time of the impregnation process. When this impregnation path is blocked by the close contact of the cathode foil 4 and the additive layer 4a of polyvinyl-alcohol, it becomes difficult for the electrolyte solution to be well impregnated into the voids of the cathode foil 3. In addition, this may cause an insufficient contact between the additive layer 4a of polyvinyl-alcohol and the electrolyte solution, disrupting polyvinyl-alcohol to be well dissolved into the electrolyte solution. That is, polyvinyl-alcohol is not sufficiently dissolved in the electrolyte solution and remains. An insufficient impregnation of the electrolyte solution into the voids of the cathode foil 3 and the remaining of polyvinyl-alcohol may each cause a deterioration of the ESR.

In order to dissolve polyvinyl-alcohol well into the electrolyte solution, a thermal process time through a chemical re-conversion process may be extended. When, however, the chemical re-conversion process time is extended, the productivity of electrolytic capacitors decreases.

This is a technical problem caused not only when polyvinyl-alcohol is applied to the separator 4 but also when the additive layer 4a to be dissolved in the electrolyte solution is formed on the surface of the separator 4, resulting in a deterioration of the ESR or a reduction of the productivity of electrolytic capacitors.

The present disclosure has been proposed in order to address the foregoing technical problems, and an objective is to provide an electrolytic capacitor which is provided with a capacitor element and a method of manufacturing the same, that includes a separator on which an additive layer is formed before an impregnation of the capacitor element, achieving a suppression of an ESR rise and an improvement of a productivity.

Solution to Problem

A capacitor according to the present disclosure includes a capacitor element, and the capacitor element includes an anode foil and a cathode foil laminated and wound via a separator and wound, and the separator includes an additive layer applied on only one surface of the separator, in which at least the separator having a surface at the center side of the electrolytic capacitor facing the anode foil and a surface at the outer circumference side of the electrolytic capacitor facing the cathode foil, has the additive layer formed on the surface at the center side of the electrolytic capacitor.

According to the present disclosure, the additive layer faces the surface of the anode foil or the outer circumference surface of the cathode foil. Since no additive layer is formed on the surface of the separator pushed against the cathode foil by repulsive force from the wound anode foil, the cathode foil and the separator do not become in close contact with each other.

First, as for the separator that faces the anode foil at the center side of the capacitor element, since sufficient concavities and convexities are formed in the surface of the anode foil by an area increasing process, the impregnation path for the electrolyte solution is ensured between the anode foil and the additive layer of the separator.

Next, as for the separator that faces the anode foil by a surface at the outer circumference side of the capacitor element, in other word, the separator that faces the cathode foil by a surface at the center side of the capacitor element, since the anode foil expands in a direction apart from the separator, the separator receives no repulsive force pushing in the direction toward the adjacent cathode foil. Hence, as for this separator, the sufficient impregnation path for the electrolyte solution between the cathode foil and the separator is ensured. As for the space between the separator and the anode foil, since the anode foil expands and a distance increases, the sufficient impregnation path for the electrolyte solution is ensured.

Note that the cathode foil is not subjected to a chemical conversion process unlike the anode foil, or even if subjected, a little chemical conversion process is performed in comparison with the anode foil such that a hard and thick oxide film is not formed on the surface of the cathode foil unlike the anode foil. Accordingly, the cathode foil is more flexible than the anode foil, and a repulsive force expanding toward the outer circumference, produced when wound, is small. Hence, the force directed to the separator one layer adjacent to the cathode foil at the outer circumference side is quite small, and thus, as for the separator that faces the cathode foil at a surface at the center side of the capacitor element, the additive layer does not become in close contact with the cathode foil even if formed on the surface facing the cathode foil, and the impregnation path for the electrolyte solution is ensured. Accordingly, as for this separator, the additive layer can be formed on any surfaces.

Therefore, by employing the structure of the present disclosure, the additive layer of the separator contacts well to the electrolyte solution, the additive is dissolved well in the electrolyte solution, and thus an ESR increase of the electrolytic capacitor due to the additive remained is suppressed. Needless to say, as for all separators, the additive layers may be formed on respective surfaces facing toward the center side of the capacitor element.

The additive layer is to be added to the electrolyte solution, while at the same time, has a characteristic of increasing the viscosity of the electrolyte solution, and is a withstand voltage improving agent, a flame-retardant agent, etc. Exemplary withstand voltage improving agents are polyvinyl-alcohol, polyethylene-glycol, colloidal silica, or a mixture thereof.

On the other hand, when the additive layer is polyvinyl-alcohol, as for the separator which faces the cathode foil at a surface at the center side of the capacitor element, and which faces the anode foil at a surface at the outer circumference side of the capacitor element, it is preferable that the additive layer is formed on the surface at the outer circumference side of the capacitor element. This is because when layers of polyvinyl-alcohol are formed on both surfaces of the anode foil, an effect of pushing out the electrolyte solution from the pits of the anode foil is efficiently suppressed, and thus an ESR increase is further suppressed.

That is, when a low state of the withstand voltage of the electrolyte solution continues, a leakage current is produced at the anode foil when a voltage is applied. When the leakage current increases, the electrolytic capacitor generates heat, and the thermal energy increases. This advances a chemical reaction, and a gas can easily be produced. This gas may easily push out the electrolyte solution from the pits of the anode foil. When the electrolyte solution is pushed out from the pits of the anode foil, voids are formed in the pits. This becomes a cause of an ESR increase.

When layers of polyvinyl-alcohol are formed on both surfaces of the anode foil, polyvinyl-alcohol that is the withstand voltage improving agent is quickly applied to the anode foil, resulting in improving the withstand voltage of the electrolyte solution, and suppressing aforementioned event. Hence, an ESR increase of the electrolytic capacitor is further suppressed.

Advantageous Effects of Invention

According to the present disclosure, since the impregnation path for the electrolyte solution to the additive layer of the separator is ensured, an ESR increase of the electrolytic capacitor is suppressed, and an improvement of the productivity of the electrolytic capacitor is achieved without an extension of a chemical re-conversion process time to dissolve the additive layer in the electrolyte solution.

DESCRIPTION OF EMBODIMENTS

An electrolytic capacitor and a method of manufacturing the same according to embodiments of the present disclosure will be explained below in detail with reference to the figures.

(First Embodiment)
(Structure)

A structure of an electrolytic capacitor according to a first embodiment will be explained in detail with reference to FIGS. 1 and 2. The electrolytic capacitor is manufactured by impregnating a capacitor element 1 illustrated in FIG. 1 with an electrolyte solution, placing the capacitor element 1 into an outer casing, sealing the outer casing by a seal body, and finally performing a chemical re-conversion process.

Figure 1:
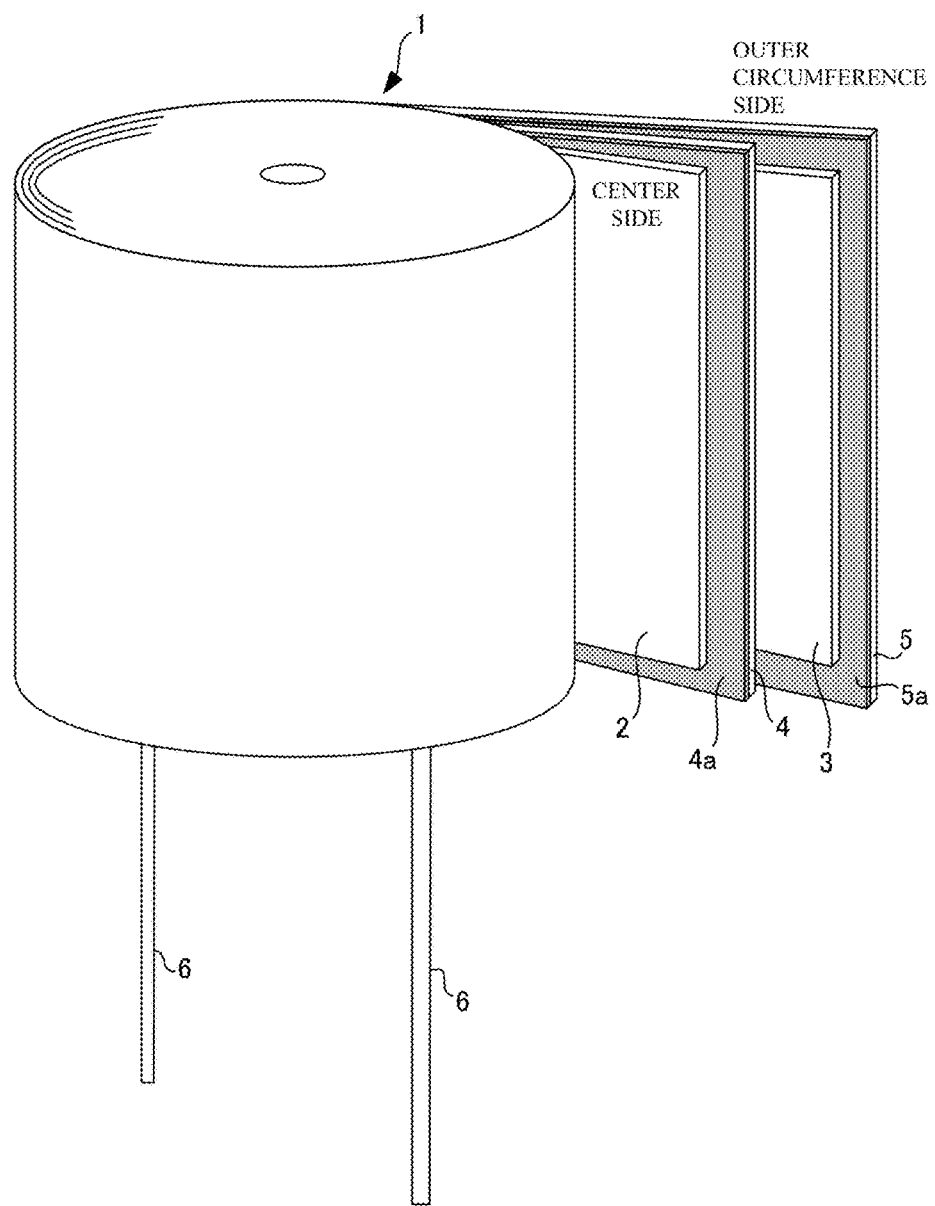
FIG. 1 is a perspective view illustrating a manufacturing process of a capacitor element of an electrolytic capacitor according to a first embodiment.

As illustrated in FIG. 1, this capacitor element 1 is manufactured by connecting lead terminals 6, 6 to an anode foil 2 and a cathode foil 3 respectively, laminating the anode foil 2 and the cathode foil 3 with each other via a separator 4 and a separator 5 therebetween, and winding this laminated sheet.

A method for winding this laminated sheet is not limited to any particular scheme, but it is desirable that the cathode foil 3 to disposed at the outer circumference side in view of the improvement of a heat dissipation performance. For example, the cathode foil 3, the separator 5, the anode foil 2, and the separator 4 are laminated in this sequence, and this laminated sheet is wound in the counterclockwise direction from the left end of the laminated sheet. In addition, the lengthwise direction of a single separator may be divided into two pieces, the right side may be utilized as the separator 4, while the left side may be utilized as the separator 5. The cathode foil 3 may be placed on the upper surface of the separator 4, the anode foil 2 may be disposed on the lower surface of the separator 5, and the laminated sheet may be wound in the counterclockwise direction from the center thereof so as to place the anode foil 2 under the lower surface of the separator 4.

In this case, due to the winding, the one separator 4 faces the anode foil 2 at the center side of the capacitor element 1, and faces the cathode foil 3 at the outer circumference side of the capacitor element 1. The other separator 5 faces the anode foil 2 at the outer circumference side of the capacitor element 1, and faces the cathode foil 3 at the center side of the capacitor element 1, due to the winding.

Respective additive layers 4a, 5a are stuck on respective one surfaces of the separator 4 and the separator 5 prior to an impregnation. The surfaces on which the additive layers 4a, 5a are formed are surfaces located at the center side of the capacitor element 1. That is, the separator 4 which faces the anode foil 2 at the center side of the capacitor element 1 and faces the cathode foil 3 at the outer circumference side of the capacitor element 1 due to the winding, has the additive layer 4a formed on a surface facing the anode foil 2, and has no additive layer 4a formed on a surface facing the cathode foil 3. On the other hand, due to winding, the separator 5 which faces the anode foil 2 at the outer circumference side of the capacitor element 1 and faces the cathode foil 3 at the center side of the capacitor element 1 due to the winding, may have the additive layer 5a formed on any surfaces.

According to this electrolytic capacitor, although the thickness of the anode foil 2 is not limited to any particular thickness, the anode foil 2 is formed by increasing a surface area by performing an area increasing process on a valve metal foil, such as an aluminum foil, a tantalum foil, a niobium foil, or a titanium foil, that have a thickness of substantially 112-136 μm, and subsequently forming an oxide film on the surface of the valve metal foil. As for the area increasing process, a current-carrying process is performed on the valve metal foil in an acidic solution to form pits in the surface of the valve metal foil, and diameters of the pits are enlarged by chemical dissolution in the acidic solution at a high temperature. As for the oxide film, an oxide film layer is formed on the valve metal foil by applying, in an acid, such as ammonium brorate, ammonium phosphate, or ammonium adipate, or an acid solution thereof, a voltage until the voltage reaches a predetermined voltage.

The cathode foil 3 is formed by enlarging the surface area by an area increasing process performed on a metal foil, such as an aluminum foil, a tantalum foil, a niobium foil, or a titanium foil. No oxide film is formed on the cathode foil 3. In addition, as for the cathode foil 3, the relationship between the surface area and the static capacitance of the electrolytic capacitor is little in comparison with the anode foil 2. Hence, the area increasing process is performed on the cathode foil 3 with a lower surface roughness than that of the anode foil 2. In addition, since the cathode foil 3 does not need a high densification to a level needed for the anode foil 2, the thickness of the metal foil is not limited to any particular thickness, but is substantially 20-60 μm.

As for the separator 4 and the separator 5, natural fibers, such as a non-woven cloth, a Manila paper, a craft paper, and a cellulose paper, may be mainly applied, synthetic fibers may be mainly applied, or fibers, such as glass and synthetic polymer, may be applied.

The electrolyte solution is not limited to any particular kind, but it is preferable that the solvent of the electrolyte solution is ethylene glycol, and other solvents are also applicable concurrently. As for such solvents, as polar protic organic solvents, monovalent alcohols (ethanol, propanol, butanol, pentanol, hexanol, cyclo-butanol, cyclo-pentanol, cyclo-hexanol, benzyl alcohol, etc.), multivalent alcohols and oxy-alcohol compounds (propylene glycol, glycerin, methyl-cellosolve, ethyl-cellosolve, methoxy-propylene-glycol, and di-methoxy-propanol, etc.) can be cited. In addition, as polar non-protic organic solvents, amide series (N-methyl-formamide, N, N-dimethyl-formamide, N-ethylformamide, N, N-diethyl-formamide, N-methyl-acetamide, N, N-dimethyl-acetamide, N-ethyl-acetamide, N, N-diethyl-acetamide, and hexamethylphosphoric-amide, etc.), lactones, cyclic-amide series (γ-butyrolactone, N-methyl-2-pyrolidone, ethylene-carbonate, propylene-carbonate, isobutylene-carbonate, and isobutylene-carbonate, etc.), nitrile series (acetonitrile, etc.), and oxide series (dimethyl-sulfoxide, etc.) can be typically cited.

As solutes contained in the electrolyte solution, ammonium salt, amine salt, quaternary ammonium salt, and quaternary salt of cyclic amidine compound, which are normally applied as an electrolyte solution to activate electrolytic capacitors and contain anionic constituent that is the acidic conjugate base, can be cited. As amines constituting the amine salt, primary amine (methylamine, ethylamine, propylamine, butylamine, and ethylenediamine, etc.), secondary amine (dimethylamine, diethylamine, dipropylamine, methylethylamine, and diphenylamine, etc.), and tertiary amine (trimethylamine, triethylamine, tripropylamine, triphenylamine, and 1,8-diazabicyclo-(5,4,0)-undecene-7, etc.) can be cited. As quaternary ammoniums that constitute quaternary ammonium salt, tetraalkyl-ammonium (tetramethylammonium, tetraethylammonium, tetrapropylammonium, tetrabutylammonium, methyl-triethyl-ammonium, and dimethyl-ammonium, etc.), and pyridium (1-methyl-pyridium, 1-ethyl-pyridium, and 1,3-diethyl-pyridium, etc.) can be cited. In addition, as cation that constitutes the quaternary cyclic amidine compounds, cations that is the following quaternized compound can be cited. That is, imidazole monocyclic compound (imidazole homologue such as 1-methyl-imidazole, 1,2-dimethyl-imidazole, 1,4-dimethyl-2-ethyl-imidazole, and 1-phenyl-imidazole, oxyalkyl derivant such as 1-methyl-2-oxymethyl-imidazole, and 1-methyl-2-oxyethyl-imidazole, nitro and amino derivant such as 1-methyl-4(5)-nitro-imidazole, and 1,2-dimethyl-4(5)-nitro imidazole, etc.), benzo-imidazole (1-methyl-benzoimidazole, and 1-methyl-2-benzyle-benzo-imidazole, etc.), compound containing 2-imidazorine ring (1-methyl-imidazorine, 1,2-dimethyl-imidazorine, 1,2,4-trimethyl-imidazorine, 1,4-dimethyl-2-ethyl-imidazorine, and 1-methyl-2-phenyl-imidazorine, etc.), and compound containing tetra-hydro-pyrimidine ring (e.g., 1-methyl-1,4,5,6-tetrahydro-pyrimidine, 1,2-dimethyl-1,4,5,6-tetrahydro-pyrimidine, 1,2-dimethyl-1,4,5,6-tetrahydro-pyrimidine, 1,8-diazabicyclo[5.4.0]undecene-7, and 1,5-diazabicylo[4.3.0]nonene, etc.) can be cited. As anionic constituents, acidic conjugate bases, such as carboxylic acid, phenols, boric acid, phosphoric acid, carbonic acid, and silicic acid, etc. can be exemplified.

(Action and Effect)

Figure 2:
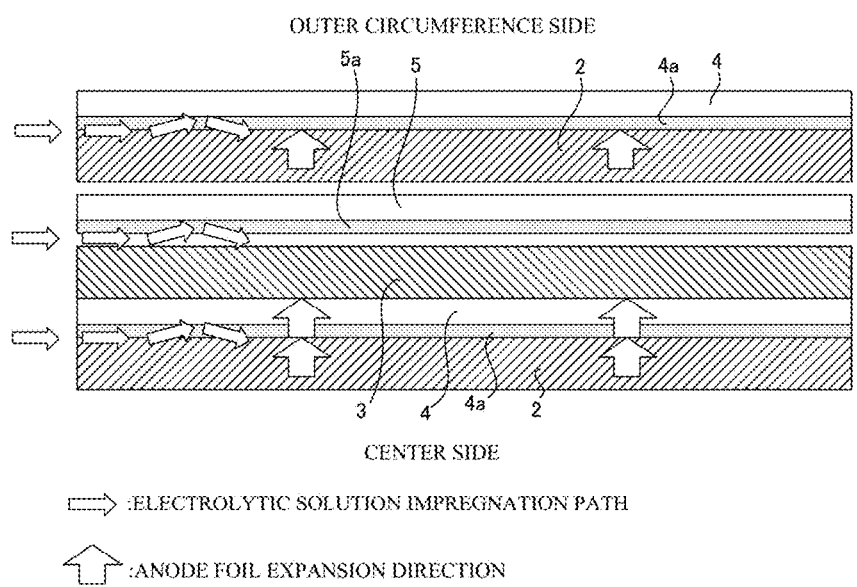
FIG. 2 is a partial cross-sectional view illustrating a state in which an electrolyte solution is impregnated into the capacitor element according to the first embodiment.

FIG. 2 shows a state in which the capacitor element 1 is impregnated with the electrolyte solution, and is a partial cross-sectional views cut along the orthogonal direction to the axial center. As illustrated in FIG. 2, the anode foil 2 is expanded toward the outer circumference side of the capacitor element 1 by the repulsive force against winding. By this repulsive force, the separator 4 which is disposed at the outer circumference side of the anode foil 2 is pushed up toward the outer circumference side of the capacitor element 1 by the anode foil 2. The separator 4 is located adjacent to the cathode foil 3 at the outer circumference side of the capacitor element 1. Hence, the outer circumference surface of the separator 4 pushed toward the outer circumference side of the capacitor element 1 depresses the cathode foil 3.

However, this separator 4 has the additive layer 4a formed on a surface at the anode-foil-2 side, and no additive layer 4a is present at the cathode-foil-3 side. Accordingly, an event in which the additive layer 4a of the separator 4 becomes in close contact with the surface of the cathode foil 3, which prevents the additive from being dissolved, does not occur.

On the other hand, the separator 4 is pushed by the anode foil 2 so that the additive layer 4a of the separator 4 is in contact with the surface of the anode foil 2, however since the surface of the anode foil 2 has a large surface roughness, the additive layer 4a does not become in close contact with the surface of the anode foil 2, and the impregnation path between the anode foil 2 and the separator 4 is also ensured. That is, the additive layer 4a formed on the separator 4 contacts well with the electrolyte solution by an impregnation process, facilitating the additive to be dissolved in the electrolyte solution. Hence, the additive layer 4a is dissolved in the electrolyte solution even without a heating for a long time through a chemical re-conversion process, suppressing an ESR increase due to the remained additive layer 4a, and improving the production efficiency by the time reduction of the chemical re-conversion process.

Note that the cathode foil 3 receives the repulsive force from the anode foil 2 to some level via the separator 4, but does not largely expand toward the outer circumference side of the capacitor element 1. Hence, the surface of the cathode foil 3 at the outer circumference side of the capacitor element 1 does not become in close contact with the separator 5 disposed outwardly relative to the cathode foil 3. In addition, the anode foil 2 located adjacent to the separator 5 at the surface at the outer circumference side of the capacitor element 1 expands in a direction apart from the separator 5. Hence, the separator 5, which is located adjacent to the cathode foil 3 at the surface at the center side of the capacitor element 1 and is located adjacent to the anode foil 2 at the surface at the outer circumference side of the capacitor element 1, ensures good impregnation path along both side of surfaces regardless of on which surface the additive layer 5a is formed.

(Second Embodiment)

(Structure)

Figure 3:
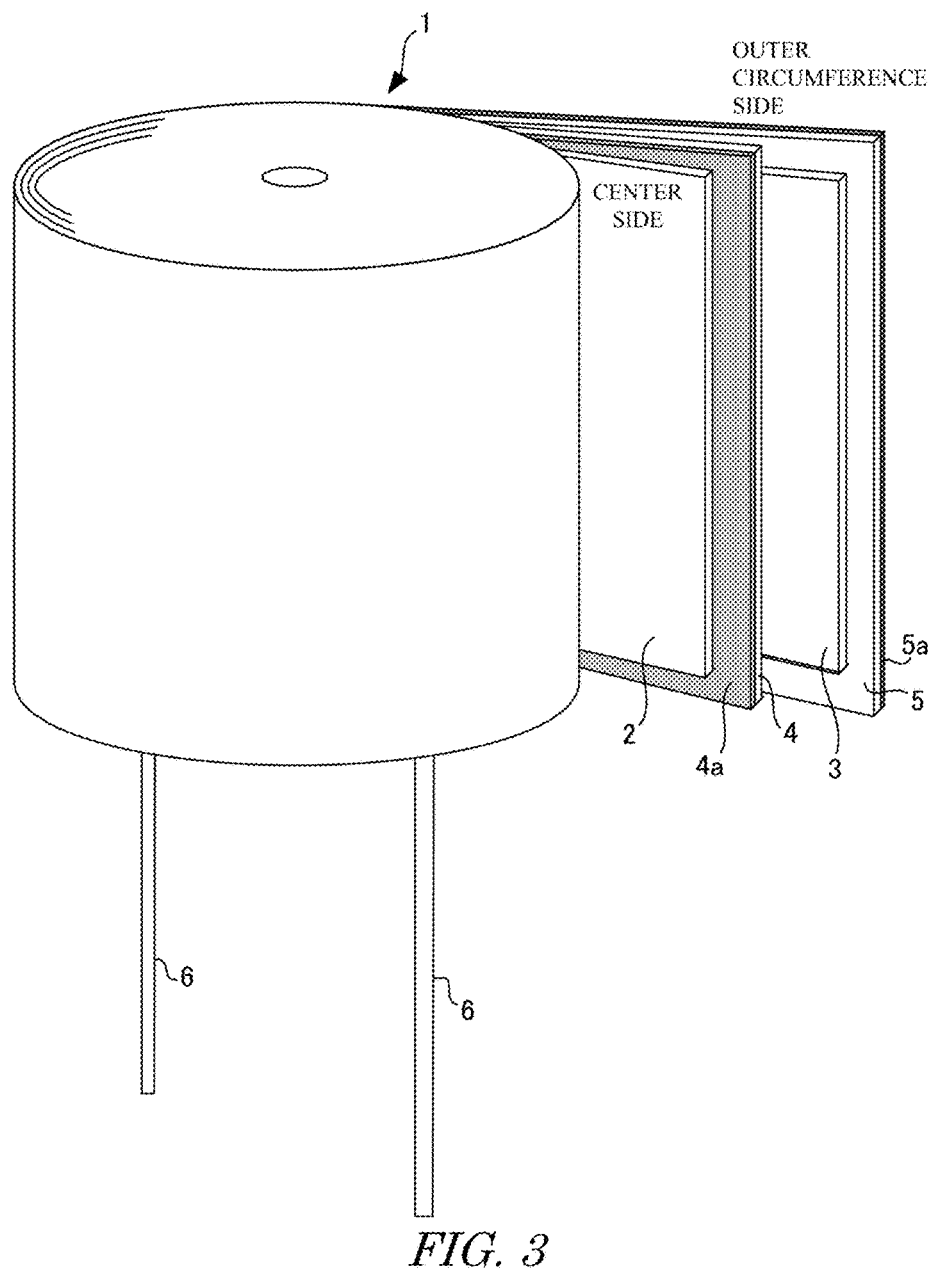
FIG. 3 is a perspective view illustrating a manufacturing process of a capacitor element of an electrolytic capacitor according to a second embodiment.

The structure of an electrolytic capacitor according to a second embodiment will be explained in detail with reference to FIGS. 3 and 4. As illustrated in FIG. 3, each separators 4, 5 may be disposed in away that respective additive layers 4a, 5a may be disposed to face surfaces of the adjacent anode foil 2. That is, as for the separator 5, which is located adjacent to the anode foil 2 at the outer circumference side of the capacitor element 1 and located adjacent to the cathode foil 3 at the center side of the capacitor element 1, the additive layer 5a is also formed on not the surface facing the cathode foil 3 but on the surface facing the anode foil 2.

(Action and Effect)

Figure 4:
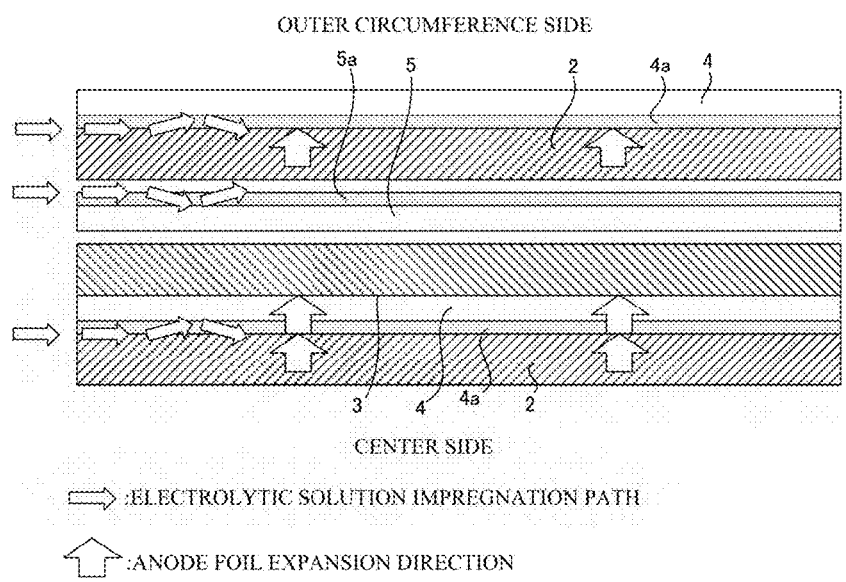
FIG. 4 is a partial cross-sectional view illustrating a state in which an electrolyte solution is impregnated into a capacitor element according to a the second embodiment.
Figure 5:
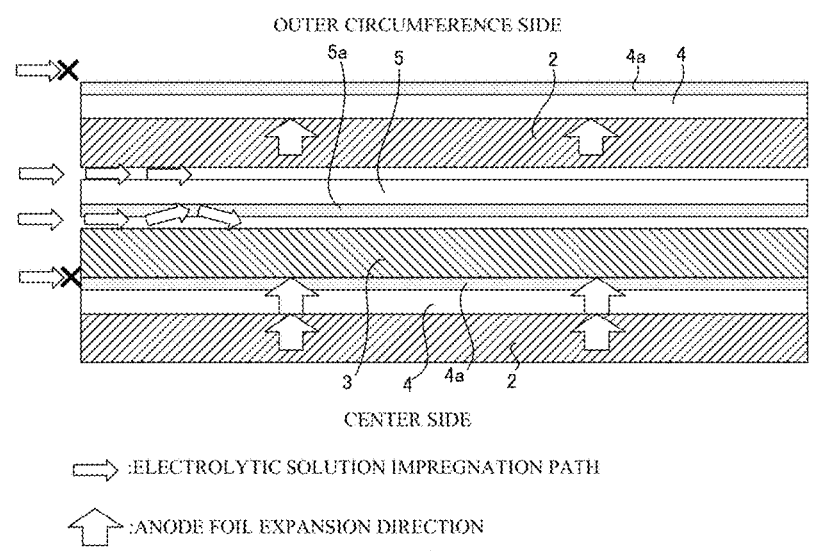
FIG. 5 is a partial cross-sectional view illustrating a state in which an electrolyte solution is impregnated into a capacitor element according to a conventional technology.

FIG. 4 shows a state in which the capacitor element 1 is impregnated with the electrolyte solution, and is a partial cross-sectional view illustrating cut along the orthogonal direction to the axial center. According to this capacitor element 1, the winding causes the additive layer 4a and the additive layer 5a to face respective surfaces of the anode foil 2 and the additive is supplied quickly and sufficiently to both surfaces of the anode foil 2.

Hence, when, for example, the additive layer 4a and the additive layer 5a are polyvinyl-alcohol that is the withstand voltage improving agent, polyvinyl-alcohol spreads quickly and sufficiently to the pits of the anode foil 2, increasing the withstand voltage of the electrolyte solution, and suppressing a rise of an Equivalent Series Resistance (ESR) of the electrolytic capacitor. That is, the electrolyte solution before polyvinyl-alcohol is dissolved is in a low withstand voltage state. Hence, when a voltage is applied, an effect is given to the electrode foil, which is likely to cause a leakage current. When the electrolytic capacitor generates heat by the leakage current, the chemical reaction of the electrolyte solution may advance due to the thermal energy, and a gas may be produced. This gas tends to push out the electrolyte solution from the pits of the anode foil 2.

In this case, since voids are formed in the pits of the anode foil 2, the ESR increases, but if polyvinyl-alcohol has been quickly and sufficiently spread to the pits of the anode foil 2, the withstand voltage of the electrolyte solution increases and an effect of voltage application to the anode foil 2 is suppressed, and an event in which the electrolyte solution is pushed out from the pits of the anode foil 2 by the produced gas is avoided, enabling a suppression of an ESR increase.

EXAMPLE

Examples according to the present disclosure will be explained in detail with reference to FIGS. 1 and 2. The anode foil 2 and the cathode foil 3 were laminated with each other via the separators 4, 5 having respective one surfaces adhered with polyvinyl-alcohol, and wound to produce the capacitor element 1. This capacitor element was impregnated with the electrolyte solution, placed in the outer casing, and this outer casing was sealed by a seal body. A chemical re-conversion process was applied, and the electrolytic capacitor was manufactured. As for the size of the capacitor, the diameter was 13.5 mm, and the entire length was 40 mm.

The capacitor element 1 according to this example has polyvinyl-alcohol layers 4a, 5a disposed on the respective surfaces of the separators 4, 5 at the center side of the capacitor element 1. That is, the separator 4, which is located adjacent to the anode foil 2 at the surface at the center side of the capacitor element 1 and is located adjacent to the cathode foil 3 at the surface at the outer circumference side of the capacitor element 1, has the additive layer 4a, which is polyvinyl-alcohol, formed on the surface facing the anode foil 2, but no layer of polyvinyl-alcohol on the surface facing the cathode foil 3.

Comparative Example

A separator was disposed in a way that the layer of polyvinyl-alcohol faces the cathode foil. That is, the separator was disposed in a way that respective layers of polyvinyl-alcohol of the separator faces respective surfaces of the cathode foil at both the outer circumference side and the center side of the capacitor element 1, and no layer of polyvinyl-alcohol was present on the surface of the separator facing and is adjacent to the anode foil. The capacitor element 1 was produced through the same manufacturing method as that of the example including the chemical re-conversion time except that the disposition structure of the polyvinyl-alcohol layer, and was impregnated with the electrolyte solution, and placed in the outer casing. This outer casing was sealed by a seal body, and thus an electrolytic capacitor was manufactured.

(Result)

30 electrolytic capacitors were produced for each of the example and the comparative example, and AC was applied to those electrolytic capacitors to measure initial characteristics. As for the initial characteristics, measurements were made for tan δ, ESR, and Leakage Current (LC). tan δ was measured by applying AC of 120 Hz, and ESR was measured for cases in which AC of 100 Hz and 40 kHz was applied. The following table shows respective average values of the initial characteristics.

| | tan δ | ESR ($\Omega$) | | LC (µA) |
|---|---|---|---|---|
| | 120 Hz | 100 Hz | 40 kHz | |
| Example | 0.055 | 2.218 | 0.872 | 5.39 |
| Comparative Example | 0.073 | 2.959 | 1.051 | 6.90 |

As is clear from the above table, the electrolytic capacitor of the example showed good results for all measured entries in comparison with the electrolytic capacitor of the comparative example. According to the electrolytic capacitor of the example, since the impregnation path for the electrolyte solution was ensured by the cathode foil 3 and the additive layer 4a of the separator 4 not being in close contact with each other, the effect of the addition of polyvinyl-alcohol was fully achieved, and the electrical characteristics of the measured entries, which were tan δ and Leakage Current (LC), were improved by the addition to the electrolyte solution. In particular, it becomes clear from the table that polyvinyl-alcohol did not remain and insufficient impregnation of the electrolyte solution into the pits of the cathode foil 3 did not occur, and an effect of suppressing an ESR increase was sufficient.

(Other Embodiments)

The additive layer 4a may be uniformly applied to the surface of the separator, but also the surface of the additive layer 4a may be in a concavo-convex shape. According to this structure, the impregnation path for the electrolyte solution is ensured by the concavo-convex surface between the additive layer 4a and the electrode foil, further facilitating polyvinyl-alcohol to be dissolved. As for means for achieving the concavo-convex shape, the thickness of the additive layer 4a may be made uneven, or the additive layer 4a may be formed intermittently in a way that the additive layer is applied in a dot pattern or in a linear pattern. In addition, the surface of the separator to which the additive layer 4a is to be applied may be formed in a concavo-convex shape beforehand, and the additive such as polyvinyl-alcohol may be applied thereto, so as to make the concavo-convex surface of the additive layer 4a.

REFERENCE SIGNS LIST

1 Capacitor element
2 Anode foil
3 Cathode foil
4 Separator
4a Additive layer
5 Separator
5a Additive layer

The invention claimed is:

1. A capacitor comprising a capacitor element, the capacitor element having an anode foil and a cathode foil laminated and wound via separators,
    wherein the separators include a first separator and a second separator,
    wherein the first separator has a first surface at a center side of the capacitor element facing the anode foil and a second surface at an outer circumference side of the capacitor element facing the cathode foil,
    wherein the second separator has a first surface at the center side of the capacitor element facing the cathode foil and a second surface at the outer circumference side of the capacitor element facing the anode foil,
wherein the second separator has an additive layer formed on one of its first and second surfaces, and has no additive layer formed on the other of its first and second surfaces, and
wherein the first separator has an additive layer formed on its first surface, and has no additive layer formed on its second surface.

2. The capacitor according to claim 1, wherein each of the additive layers is a polyvinyl-alcohol layer.

3. The capacitor according to claim 2, wherein the one surface of the second separator is the second surface thereof.

4. The capacitor according to claim 1, wherein the one surface of the second separator is the second surface thereof.

5. The capacitor of claim 1, wherein the anode foil has a thickness of substantially 112-136 µm.

6. A method of manufacturing a capacitor, comprising:
forming a capacitor element having an anode foil and a cathode foil laminated and wound via separators; and
impregnating an electrolyte solution into the capacitor element,
wherein the separators include a first separator and a second separator,
wherein the first separator has a first surface at a center side of the capacitor element facing the anode foil and a second surface at an outer circumference side of the capacitor element facing the cathode foil,
wherein the second separator has a first surface at the center side of the capacitor element facing the cathode foil and a second surface at the outer circumference side of the capacitor element facing the anode foil,
wherein the second separator has an additive layer formed on one of its first and second surfaces, and has no additive layer formed on the other of its first and second surfaces, and
wherein the first separator has an additive layer formed on its first surface, and has no additive layer formed on its second surface.

7. The capacitor manufacturing method according to claim 6, wherein each of the additive layers is a polyvinyl-alcohol layer.

8. The capacitor manufacturing method according to claim 7, wherein the one surface of the second separator is the second surface thereof.

9. The capacitor manufacturing method according to claim 6, wherein the one surface of the second separator is the second surface thereof.

10. The method of claim 6, wherein the anode foil has a thickness of substantially 112-136 µm.

* * * * *